United States Patent
Nagai et al.

(10) Patent No.: US 9,258,760 B2
(45) Date of Patent: Feb. 9, 2016

(54) RADIO COMMUNICATION APPARATUS

(75) Inventors: Yukimasa Nagai, Tokyo (JP); Yosuke Yokoyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 18 days.

(21) Appl. No.: 14/376,500

(22) PCT Filed: May 29, 2012

(86) PCT No.: PCT/JP2012/063803
§ 371 (c)(1),
(2), (4) Date: Aug. 4, 2014

(87) PCT Pub. No.: WO2013/179397
PCT Pub. Date: Dec. 5, 2013

(65) Prior Publication Data
US 2014/0378179 A1    Dec. 25, 2014

(51) Int. Cl.
*H04B 7/00*    (2006.01)
*H04W 40/16*    (2009.01)
(Continued)

(52) U.S. Cl.
CPC .............. *H04W 40/16* (2013.01); *H04W 4/046* (2013.01); *H04W 16/14* (2013.01); *H04W 64/00* (2013.01); *H04W 72/082* (2013.01); *G01S 7/023* (2013.01); *H04W 48/16* (2013.01)

(58) Field of Classification Search
CPC . H04W 16/14; H04W 48/16; H04W 72/0433; H04W 72/0453; H04W 84/12; H04W 4/046; H04W 72/08
USPC ........ 455/509, 552.1, 553.1, 500, 517, 67.11, 455/550.1, 515, 513, 514, 63.1, 63.3, 66.1, 455/426.1, 426.2, 422.1, 403, 421, 455/432.1–432.2, 454, 445, 450; 370/310, 370/328, 329, 338, 343
See application file for complete search history.

(56) References Cited

U.S. PATENT DOCUMENTS

2004/0023674 A1    2/2004  Miller
2009/0311964 A1   12/2009  Yamamoto
(Continued)

FOREIGN PATENT DOCUMENTS

JP    2001-285301    10/2001
JP    2002-141853     5/2002
(Continued)

OTHER PUBLICATIONS

International Search Report issued Jul. 31, 2012, in PCT/JP12/063803, filed May 29, 2012.
(Continued)

*Primary Examiner* — Keith Ferguson
(74) *Attorney, Agent, or Firm* — Oblon, McClelland, Maier & Neustadt, L.L.P.

(57) ABSTRACT

An in-vehicle apparatus that is a radio communication apparatus includes: a radio communication unit capable of performing radio communication using at least a 5-GHz band; a present-position detecting unit that detects a present position of the own apparatus; and a radio-communication-zone predicting unit that determines, when the radio communication unit is performing communication, whether switching of a channel of the radio communication unit is necessary on a basis of interference data, which is information concerning a coverage of a radio wave transmitted from another system that uses a 5-GHz band and transmits and receives a radio wave in a stationary state, map data, and the present position detected by the present-position detecting unit, and, when switching is necessary, further selects a switching destination channel or causes the radio communication unit to select the switching destination channel.

7 Claims, 7 Drawing Sheets

(51) Int. Cl.
*H04W 16/14* (2009.01)
*H04W 64/00* (2009.01)
*H04W 4/04* (2009.01)
*H04W 72/08* (2009.01)
*H04W 48/16* (2009.01)
*G01S 7/02* (2006.01)

(56) References Cited

U.S. PATENT DOCUMENTS

| 2009/0316667 | A1* | 12/2009 | Hirsch | H04B 1/406 370/338 |
|---|---|---|---|---|
| 2011/0286352 | A1 | 11/2011 | Kruys et al. | |
| 2013/0010830 | A1 | 1/2013 | Hori et al. | |
| 2013/0033995 | A1* | 2/2013 | Kraglund | H04W 48/16 370/252 |

FOREIGN PATENT DOCUMENTS

| JP | 2003-185444 | 7/2003 |
|---|---|---|
| JP | 2004-228851 | 8/2004 |
| JP | 2005-102165 | 4/2005 |
| JP | 2005-523616 | 8/2005 |
| JP | 2006-109044 | 4/2006 |
| JP | 2007-053726 | 3/2007 |
| JP | 2007-295079 | 11/2007 |
| JP | 2007-325041 | 12/2007 |
| JP | 2009-303047 | 12/2009 |
| JP | 2010-278764 | 12/2010 |
| JP | 2011-142562 | 7/2011 |
| WO | 2011/083568 | 7/2011 |

OTHER PUBLICATIONS

Bluetooth, "Specification of Bluetooth System", Covered Core Package Version: 3.0 + HS, Specification vol. 0, Apr. 21, 2009 (1712 Pages).

IEEE, "IEEE Standard for Information technology—Telecommunications and information exchange between systems—Local and metropolitan area networks—Specific requirements " IEEE Std. 802, Oct. 29, 2009 (536 Pages).

* cited by examiner

| SETTING POSITION INFORMATION | DETECTION POSITION DETECTION COORDINATES | TYPE | DETECTION/ UPDATE DATE AND TIME | FREQUENCY BAND | ALLOWABLE SIGNAL INTENSITY | RECEPTION POWER VALUE | SIGNAL OUTPUT | RANGE | CYCLE/ DIRECTION | CLEAR CHANNEL LIST/PRIORITY |
|---|---|---|---|---|---|---|---|---|---|---|
| POSITION a0.a0 | ... | RADAR A | ... | 5.45GHz, 20MHz | -150dBm | ... | AA mW | A km | Xx.xx | ... |
| POSITION b0.b0 | ... | RADAR B | ... | 5.55GHz, 20MHz | -150dBm | ... | BB mW | B km | Xx.xx | ... |
| POSITION c0.c0 | ... | RADAR C | ... | 5.45GHz, 20MHz | -150dBm | ... | CC mW | C km | Xx.xx | ... |
| POSITION d0.d0 | ... | RADAR D | ... | 5.55GHz, 20MHz | -150dBm | ... | DD mW | D km | Xx.xx | ... |

FIG.3B

| | SETTING POSITION INFORMATION | DETECTION POSITION DETECTION COORDINATES | TYPE | DETECTION/ UPDATE DATE AND TIME | FREQUENCY BAND | ALLOWABLE SIGNAL INTENSITY | RECEPTION POWER VALUE | SIGNAL OUTPUT | RANGE | CYCLE/ DIRECTION | CLEAR CHANNEL LIST/ PRIORITY |
|---|---|---|---|---|---|---|---|---|---|---|---|
| DETECTION INFORMATION ON RADAR A | POSITION a0.a0 | POSITION A0.A0 | RADAR A | ... | 5.45GHz, 20MHz | -150dBm | -70dBm | AA mW | A km | Xx.xx | CH OO<br>CH xx |
| | POSITION a1.a1 | POSITION A1.A1 | RADAR A | ... | 5.45GHz, 20MHz | -150dBm | -72dBm | BB mW | B km | Xx.xx | CH OO<br>CH xx |
| | POSITION a2.a2 | POSITION A2.A2 | RADAR A | ... | 5.45GHz, 20MHz | -150dBm | -68dBm | CC mW | C km | Xx.xx | CH xx |
| | POSITION a3.a3 | POSITION A3.A3 | RADAR A | ... | 5.45GHz, 20MHz | -150dBm | -73dBm | DD mW | D km | Xx.xx | CH OO |
| DETECTION INFORMATION ON UNREGISTERED RADAR STATION | ... | POSITION G1.G1 | UNREGISTERED | ... | 5.45GHz, 20MHz | ... | -72dBm | ... | ... | ... | CH OO<br>CH xx |
| | ... | POSITION G2.G2 | UNREGISTERED | ... | 5.45GHz, 20MHz | ... | -68dBm | ... | ... | ... | CH xx |
| | ... | POSITION G3.G3 | UNREGISTERED | ... | 5.45GHz, 20MHz | ... | -73dBm | ... | ... | ... | CH OO |

RADIO COMMUNICATION APPARATUS

FIELD

The present invention relates to a radio communication apparatus assumed to be used while moving.

BACKGROUND

As examples of a radio communication apparatus used in an automobile, there are a hands-free apparatus wirelessly connected to a mobile phone by Bluetooth (registered trademark), a music player, and the like. In particular, for example, like a car navigation apparatus and an in-vehicle audio apparatus, in-vehicle apparatuses incorporating functions of the hands-free apparatus and the music player apparatus are spread (see Non Patent Literature 1).

Further, there is an increasing demand for incorporating a wireless connection function by a wireless LAN (Local Area Network) in an in-vehicle apparatus, wirelessly connecting an apparatus having a wireless LAN communication function, which is carried into a vehicle by a user, and the in-vehicle apparatus, and performing radio communication among a plurality of apparatuses even in the vehicle. The wireless LAN is a radio communication technology that makes use of IEEE (The Institute of Electrical and Electronics Engineers) 802.11a/b/g/h/ac standardized by international standardization activities or Wi-Fi (registered trademark) (see Non Patent Literature 2). In particular, as communication forms by the wireless LAN, a lot of uses for communication between devices, such as personal computers, handheld game machines, and smart phones, are becoming widespread in public places, businesses, homes, and the like.

A radio communication system using the wireless LAN has been developed on the premise that the radio communication system is used in indoor and outdoor stationary environments. If the wireless communication system is introduced, it is possible to provide subscribers or users with an Internet connection service by radio in a railroad station, a store, and the like and perform communication anywhere in a home. In particular, in the case of the home, introduction of a radio communication relay station such as a wireless LAN router tends to increase according to the spread of personal computers, handheld game machines, smart phones, and the like equipped with the wireless LAN communication function.

When the number of the apparatuses using the wireless LAN increases as described above, interference with other radio communication networks poses a problem. In the wireless LAN, a 2.4-GHz band or a 5-GHz band is used. In the Bluetooth, the 2.4-GHz band is also used. Therefore, Bluetooth communication could be a cause of interference. In a stationary environment like the home, in order to avoid interference with wireless LAN networks of neighbors within the coverage of a radio wave, a method is adopted in which a radio access point (router) checks channels in use during a start and selects a non-interfering channel. Because of the stationary environment, if a channel is once secured, it is less likely that interference occurs with the respective wireless communication networks in the neighborhood. Therefore, it is possible to continue stable communication for a long period. Patent Literatures 1 and 2 disclose a method of setting, taking into account channel qualities of the Bluetooth and the wireless LAN, an FH (frequency hopping) channel of the Bluetooth such that communications do not interfere with each other.

However, when the wireless LAN is used under a moving environment such as the inside of an automobile, it is highly likely that interference is caused depending on a moving destination of the automobile. For example, in a state in which the automobile is parked on a road in a residential area or a state in which the automobile is moving extremely slowly in a residential area, when the channels of the radio wave of radio communication in the automobile and the radio wave of radio communication used in a home within the coverage of the radio wave coincide with each other or when the channel widths overlap, both or one of the radio communications is affected by interference. The same problem tends to occur when the automobile is approaching a building or the like where the radio communication is used not only in the residential area but also in a business district, a shopping district, and the like. Patent Literature 3 discloses an interference avoidance technology in the 2.4-GHz band widely used in general. According to the description of Patent Literature 3, concerning other wireless LANs, for example, information concerning other wireless LAN stations that could be interference is collected at a timing determined on the basis of the GPS function and position information by using a scan function of the wireless LAN installed in an own automobile. When it is likely that interference occurs between the wireless LAN and other wireless LAN stations, a wireless LAN channel in use is changed.

In a limited space such as the inside of an automobile, a mutual interference could occur when the wireless LAN and the Bluetooth that use the 2.4-GHz band are concurrently used. In that case, by using the wireless LAN that uses the 5-GHz band, for example, IEEE802.11a/n/ac, it is possible to avoid the interference with the Bluetooth operating in the 2.4-GHz band.

As a system anticipated to interfere with the wireless LAN, there is a radar system that uses the 5-GHz band. For example, a meteorological radar apparatus emits a radio wave from an antenna and receives the radio wave reflected by rain, cloud, and the like to observe the states of the rain, the cloud, and the like. Therefore, the meteorological radar apparatus includes a receiver having extremely high sensitivity. Similarly, an aviation radar, a military radar, and the like also include receivers having extremely high sensitivity. When a communication system such as a wireless LAN system uses a communication channel including frequencies of radar waves emitted by the above radars, interference with the radar apparatuses, in particular, the receivers may occur.

For example, in the wireless LAN in the 5-GHz band, interference with the above radars is a problem. To secure interoperability, it is necessary to have a radar detection function called DFS (Dynamic Frequency Selection) or TPC (Transmitter Power Control) and a channel shift function (or a service stop function) during detection. Specifically, when, among frequency bands called W52 (5.15 to 5.25 GHz), W53 (5.25 to 5.35 GHz), and W56 (5.47 to 5.725 GHz), W53 and W56 are used, it is essential to have the DFS function and the TPC function.

In the conventional DFS, as pre-service monitoring (Channel Availability Check), presence or absence of a radar wave is checked by monitoring a channel for sixty seconds without performing transmission before network establishment. During a service, as in-service monitoring, a radar wave is continuously monitored while communication is performed. If the radar wave is detected, within a channel move time (ten seconds or less), transmission in the channel is completely stopped (the communication is stopped) or the channel is switched to another channel without interference and the communication is continued. Note that communication cannot be performed for thirty minutes or more in the channel in which the radar wave is detected. A radio LAN system that uses the 5-GHz band having a plurality of support communication channels searches for another frequency channel without interference and moves. Therefore, time is required for the search.

Therefore, when large-capacity data such as video data is transmitted on a real-time basis using the radio communication system equipped with the wireless LAN in the 5-GHz band, if a communication channel is changed during the transmission of the video data, deficiencies occur, for example, the transmission of the video data is interrupted during the change, the video is disturbed on the receiver side of the video data, and the video is stopped. As measures against this problem, a method has been examined that realizes video transmission without the deficiencies such as the disturbance of the video and the stop of the video by selecting beforehand a communication channel that does not cause interference with a radar apparatus in order to eliminate the need for change of a communication channel during communication, (see, for example, Patent Literature 4).

CITATION LIST

Patent Literature

Patent Literature 1: WO2011/083568
Patent Literature 2: Japanese Patent Application Laid-Open No. 2010-278764
Patent Literature 3: Japanese Patent Application Laid-Open No. 2011-142562
Patent Literature 4: Japanese Patent Application Laid-Open No. 2007-053726

Non Patent Literature

Non Patent Literature 1: Bluetooth, "Specification of Bluetooth System Covered Core Package Version: 3.0+HS", 21 Apr. 2009.
Non Patent Literature 2: IEEE, "IEEE Std IEEE802.11-2012"

SUMMARY

Technical Problem

The DFS function and the TPC function concerning the wireless LAN that uses the 5-GHz band and the method described in Patent Literature 4 have been developed on the premise that the functions and the method are used in indoor and outdoor stationary environments. Therefore, when the functions and the method are applied to communication under a moving environment, a problem occurs. For example, when the 5-GHz band wireless LAN is used in a mobile body such as an automobile, depending on a moving destination of the automobile, it is likely that the wireless LAN causes interference with a meteorological radar, a military radar, an aviation radar, the like that use the same frequency band. As an example, when the automobile is parked at an airport to drop off and pick up visitors or is traveling in the airport, if the channels of the radio wave of radio communication in the automobile and the radio wave transmitted and received by an airport radar station present within the radio wave coverage coincide with each other or the channel widths partially overlap, both or one of the radio communications is affected by interference. When an automobile is approaching a building or a site where a radar is used not only in the airport but also in a hilltop where the airport can be seen, in a military base, around a meteorological radar setting plate, and the like, the same problem is likely to occur. Therefore, when a base station of the wireless LAN is fixed, by performing the DFS function during base station setup, it is possible to perform communication avoiding interference with a radar wave thereafter. However, when the base station moves, in some case, a radar station near the base station changes or a radar wave is detected according to the movement. Therefore, it is necessary to search for radar waves (radio waves emitted from other systems), which change to interference waves, at any time. Because communication is interrupted during the radar wave search, when the base station moves, there is a problem in that communication interruption equal to or longer than a fixed time occurs. Naturally, a shorter interruption time is desirable.

The technology disclosed in Patent Literature 3 is a technology for avoiding interference with other wireless LAN Systems that use the same frequency band (the 2.4-GHz band). An alarm signal such as Beacon is relatively easily received and a mutually interfering wireless LAN is detected. However, the technology does not take into account other systems such as a radar in which the radiating direction and the radiating cycle fluctuate.

The present invention has been devised in view of the above and it is an object of the present invention to obtain a radio communication apparatus that can reduce, when mounted on a mobile body such as an automobile, interference with other systems, such as a radar, that use the same frequency band.

Solution to Problem

In order to solve the above problems and achieve the object, the present invention relates to a radio communication apparatus including: a communication unit capable of performing radio communication using at least a 5-GHz band; a present-position detecting unit that detects a present position of the own apparatus; and a channel-switching control unit that determines, when the communication unit is performing communication, whether switching of a channel being used by the communication unit is necessary on a basis of other-system data, which is information concerning a coverage of a radio wave transmitted from another system that uses a 5-GHz band and transmits and receives a radio wave in a stationary state, map data, and the present position detected by the present-position detecting unit, and, when switching of the channel is necessary, further selects a switching destination channel or causes the communication unit to select the switching destination channel.

Advantageous Effects of Invention

The radio communication apparatus according to the present invention attains an effect that it is possible to realize avoidance of interference and a reduction in interference with other systems and it is possible to reduce a communication interference time during channel switching for the interference avoidance.

DESCRIPTION OF EMBODIMENTS

Embodiments of a radio communication apparatus according to the present invention are explained in detail below with reference to the drawings. Note that the present invention is not limited by the embodiments.

First Embodiment

Figure 1:
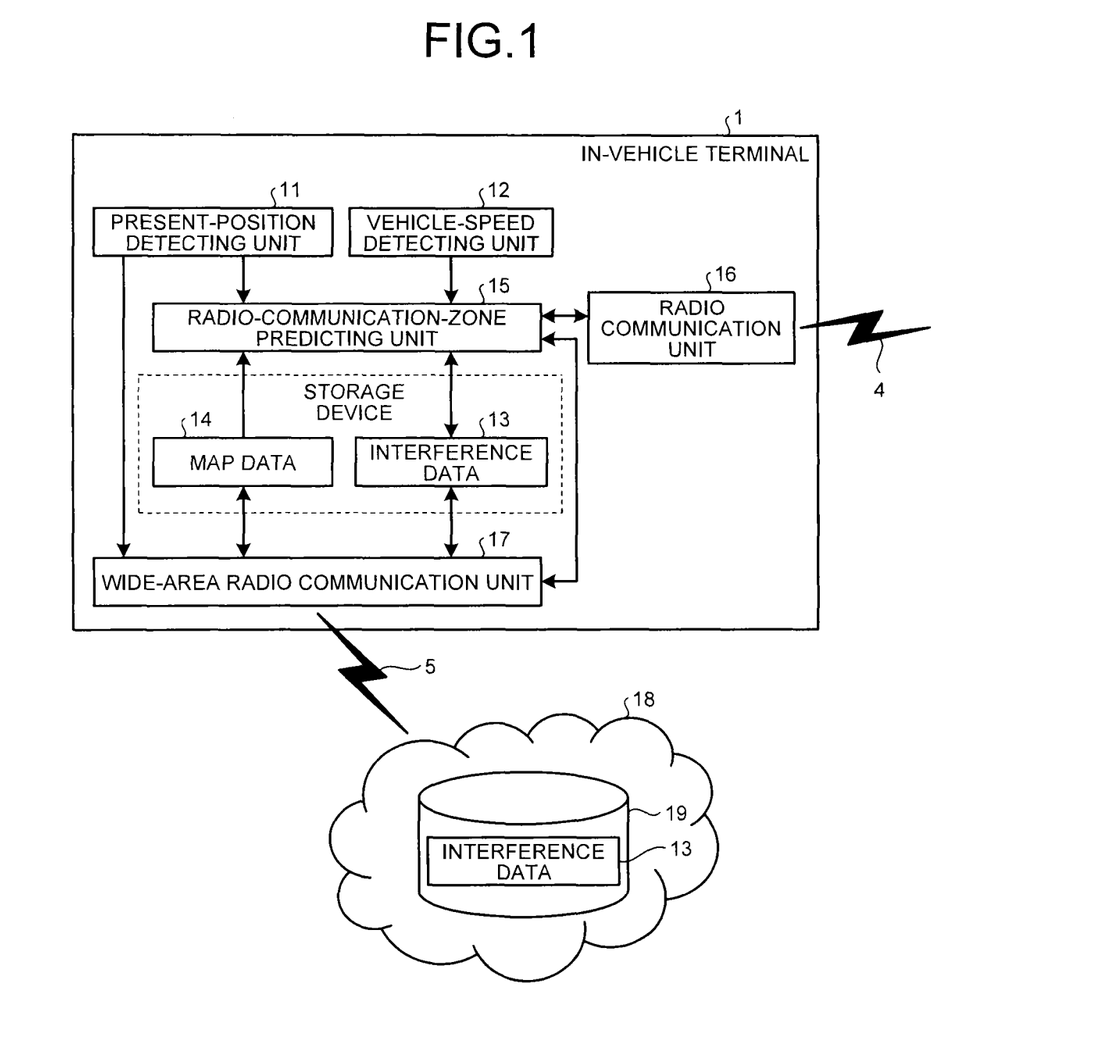
FIG. 1 is a diagram of a configuration example of an in-vehicle terminal functioning as a radio communication apparatus.

In the present embodiment, as the radio communication apparatus according to the present invention, an in-vehicle terminal that performs radio communication in a state in which the in-vehicle terminal is mounted on an automobile is explained. FIG. 1 is a diagram of a configuration example of the in-vehicle terminal in the present embodiment.

As shown in FIG. 1, an in-vehicle terminal 1 in the present embodiment includes a present-position detecting unit 11, a vehicle-speed detecting unit 12 that detects the moving speed of the own terminal (speed of an automobile on which the in-vehicle terminal 1 is mounted), a radio-communication-zone predicting unit 15 that predicts an overlapping state of the radio communication zone of the own terminal and the radio communication zone of an apparatus of another system, a radio communication unit 16 that uses at least a 5-GHz band, and a wide-area radio communication unit 17 that performs wide-area radio communication using a mobile phone (3G or LTE), WiMax, a PHS, or the like.

The radio-communication-zone predicting unit 15 predicts the radio communication zones of other systems by using interference data 13 retained on the inside (the in-vehicle terminal 1) or the interference data 13 retained on the outside and map data 14 retained on the inside. The radio communication zone indicates an area where the power level of a radio wave transmitted from a communication apparatus of another system is equal to or larger than a fixed value. The radio communication zone is an area where it is highly likely that mutual interference occurs between the in-vehicle terminal 1 and another system when communication is performed within the zone. The wide-area radio communication unit 17 acquires, by transmitting and receiving a radio wave 5, the interference data 13 retained in an external network, that is, the interference data 13 retained in, for example, a database server 19 on an Internet 18. Note that the wide-area radio communication unit 17 can be a wide-area radio communication unit connected to not only interfaces of 3G, LTE, WiMax, a PHS, or the like but also, for example, a mobile phone via a USB, a wide-area radio communication unit connected to a wide-area network using a DUN (Dial-Up Network) profile, a PAN (Personal Area Networking) profile, or the like of Bluetooth, or a wide-area radio communication unit connected by Wi-Fi tethering. The present embodiment does not limit a method of realizing the wide-area radio communication unit.

An overall operation of the in-vehicle terminal 1 is briefly explained. In the in-vehicle terminal 1, the radio-communication-zone predicting unit 15 operating as a channel-switching control unit checks, at a predetermined timing, on the basis of the present position detected by the present-position detecting unit 11 and the map data 14 and the interference data 13 (details are explained below), whether a system that uses a radio wave in the 5-GHz band is present around the in-vehicle terminal 1, specifically, whether a system subjected to interference when the radio communication unit 16 transmits a radio wave in the 5-GHz band is present. The radio-communication-zone predicting unit 15 can discriminate the presence or absence of a system subjected to interference taking into account, in addition to the present position, the map data 14, and the interference data 13, the speed detected by the vehicle-speed detecting unit 12 and the traveling direction calculated on the basis of the detection result history by the present-position detecting unit 11. When the system subjected to interference is detected, the radio-communication-zone predicting unit 15 instructs the radio communication unit 16 not to transmit a radio wave that causes interference with the detected system. When the radio communication unit 16 receives the instruction, the radio communication unit 16 stops communication performed using the 5-GHz band (when the radio communication unit 16 receives the instruction before a communication start, the radio communication unit 16 does not start the communication). When a frequency channel that does not cause interference with the system detected by the radio-communication-zone predicting unit 15 can be used, for example, when communication performed using a band other than the 5-GHz band is possible, the radio communication unit 16 switches the communication to use the frequency channel that does not cause interference. Note that, when the radio communication unit 16 receives the instruction, first, the radio communication unit 16 can perform monitoring for checking whether a system subjected to interference by communication of the radio communication unit 16 is actually present and, when the actual presence of the system can be confirmed, stop the communication and switch the frequency channel. When the monitoring is performed, it is possible to prevent, by, for example, stopping the communication or switching the frequency channel even if the system subjected to interference is not present, a decrease in throughput or a transmission delay from being unnecessarily caused. When not performing communication, the radio communication unit 16 monitors, at a predetermined timing, a system that uses the 5-GHz band (i.e., monitors a radio wave in the 5-GHz band transmitted from other systems). Note that the radio communication unit 16 also performs the monitoring upon reception of an instruction from the radio-communication-zone predicting unit 15. As a result of the monitoring, when the radio communication unit 16 detects a system that uses the 5-GHz band, the radio communication unit 16 collects information concerning the detected system and notifies the radio-communication-zone predicting unit 15 of the information as interference information. When the radio-communication-zone predicting unit 15 receives the interference information from the radio communication unit 16, the radio-communication-zone predicting unit 15 registers the interference information in the interference data 13 together with information concerning the present position and the present time.

As explained above, the in-vehicle terminal 1 monitors, on the basis of the present position, the map data 14, the interference data 13, and the like, whether another system subjected to interference when communication is performed using the 5-GHz band is present. Moreover, the in-vehicle terminal 1 actually performs monitoring at the predetermined timing and, when detecting another system that uses the 5-GHz band, collects information concerning the detected system and updates the interference data 13. When another system subjected to interference is present, the in-vehicle terminal does not perform communication using a frequency channel that causes interference. As a result, interference with other systems (a meteorological radar, an aviation radar, a military radar, and the like) that use the 5-GHz band is reduced. Note that the in-vehicle terminal 1 can execute the monitoring of other systems only during movement. In the case of a stationary state, it is less likely that other systems are detected by the monitoring. Therefore, no problem occurs even if the monitoring is stopped. By stopping the monitoring, it is possible to attain a reduction in the processing load and the power consumption. The frequency (cycle) at which the monitoring is performed can be changed as appropriate according to the moving speed. For example, the execution frequency is set high during high-speed movement and is set low during low-speed movement. In this case, as in the stop of the monitoring, it is possible to reduce the processing load and the power consumption.

Figure 2:
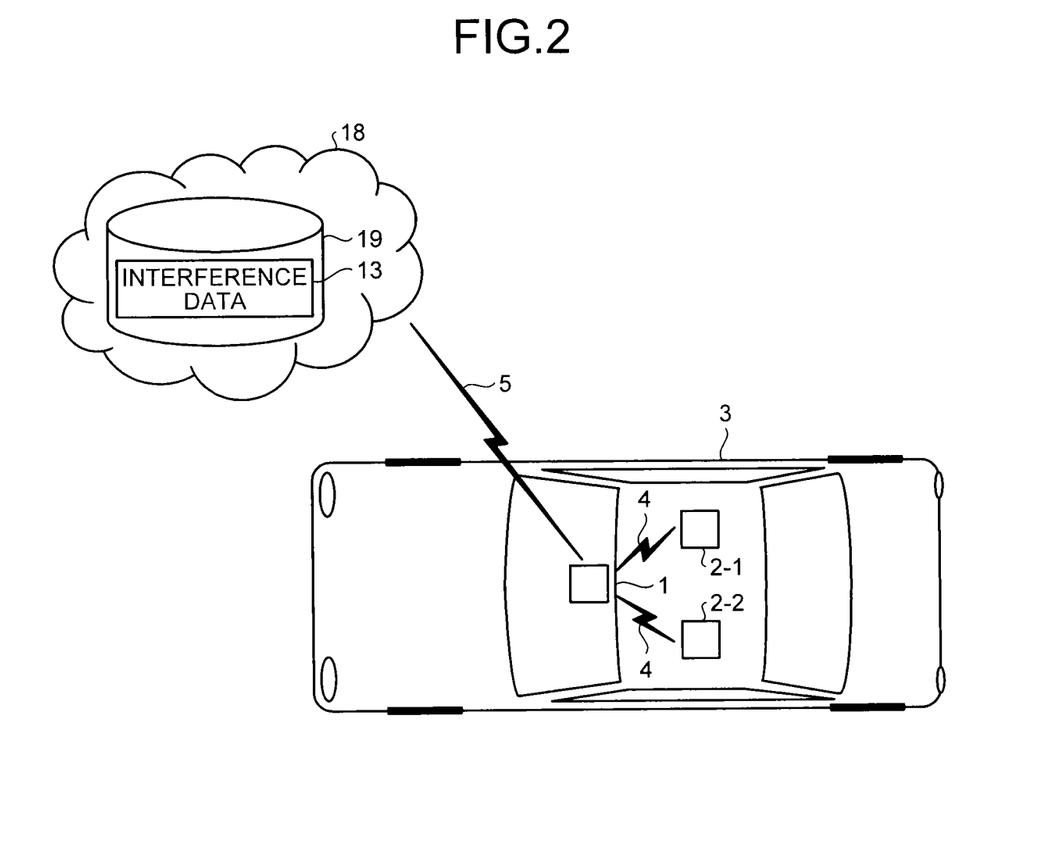
FIG. 2 is a diagram of an example of a communication environment of the in-vehicle terminal.

FIG. 2 is a diagram of an example of a communication environment of the in-vehicle terminal 1. In FIG. 2, components same as the components shown in FIG. 1 are denoted by the same reference numerals and signs. As shown in FIG. 2, in the present embodiment, it is assumed that the in-vehicle terminal 1 is mounted on a vehicle 3. The in-vehicle terminal 1 transmits and receives radio waves 4 to and from in-vehicle communication apparatuses 2-1 and 2-2, which are other terminals, and communicates with these terminals. The in-vehicle terminal 1 and other terminals (the in-vehicle communication apparatuses 2-1 and 2-2) communicate using the wireless LAN in the 5-GHz band.

The operations of the units of the in-vehicle terminal 1 shown in FIG. 1 and FIG. 2 and information used in the operations are explained. The present-position detecting unit 11 collects information (coordinates of latitude and longitude and altitude) of itself using, for example, a GPS (Global Positioning System) receiver (not shown in the figure) mounted on the vehicle 3 or a GPS receiver (not shown in the figure) included in itself (the in-vehicle terminal 1). The present-position detecting unit 11 passes the collected present position information to the radio-communication-zone predicting unit 15. Note that the position of the vehicle 3 can be used as the position of itself. A method of collecting position information is not limited to this method and can be other methods such as a method of acquiring the position information from the outside by communication. When the position information is acquired from the outside by communication, the position information can be acquired through the wide-area radio communication unit 17. When the radio communication unit 16 is connected to a hotspot outside the vehicle, the hotspot can be used.

The vehicle-speed detecting unit 12 detects the speed of the vehicle 3 as a moving speed of the own in-vehicle terminal and passes the speed information indicating the detected speed to the radio-communication-zone predicting unit 15.

Figure 3A:
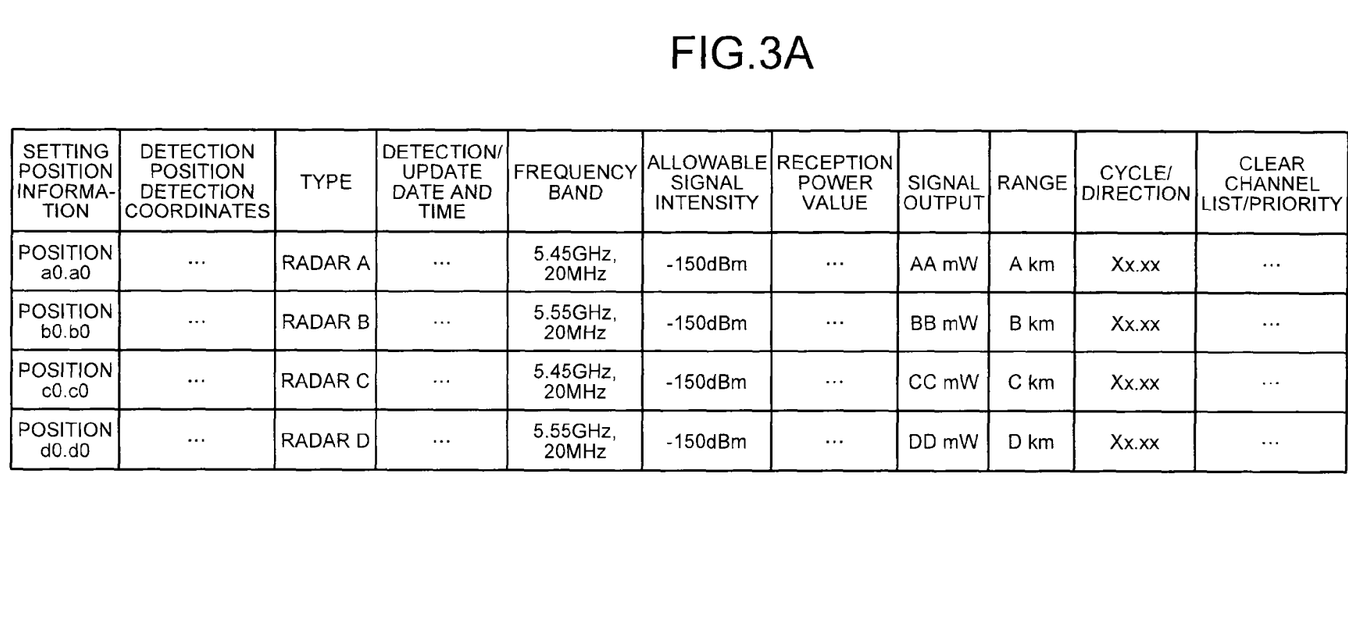
FIG. 3A is a diagram of an example of interference data.
Figure 3B:
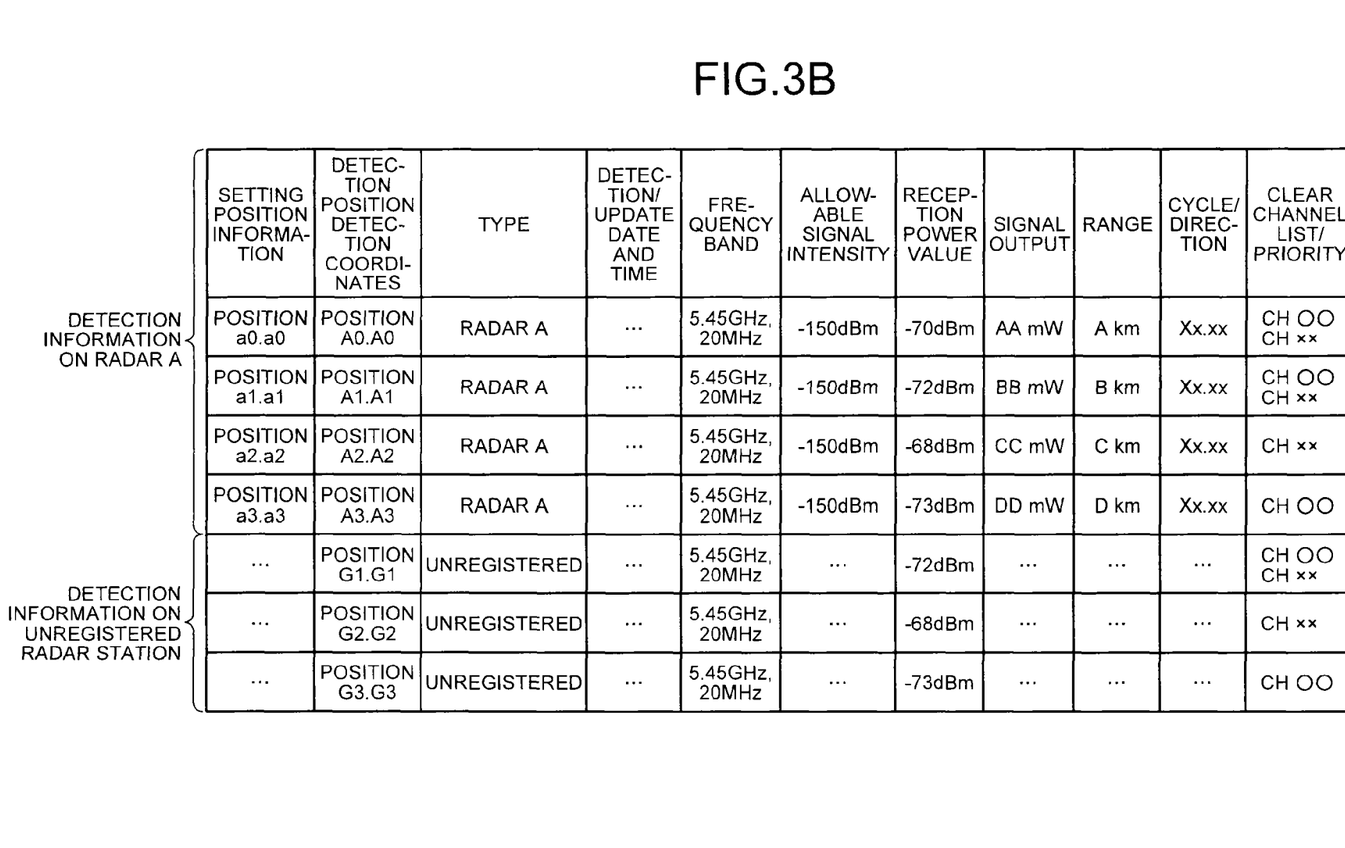
FIG. 3B is a diagram of an example of the interference data.

The interference data 13, which is other-system data, is information concerning other systems (e.g., a meteorological radar, a military radar, and an aviation radar) subjected to interference when the radio communication unit 16 performs communication using the 5-GHz band in the same manner as the radio communication unit 16 of the in-vehicle terminal 1 (see FIG. 3A and FIG. 3B). Details of the interference data 13 illustrated in FIG. 3A and FIG. 3B are separately explained. The interference data 13 includes information such as radar positions (including coordinates, heights, and angles of elevation) of other systems, a radar search cycle including time and a search direction (time when the radars execute a search for targets, a direction in which the search is performed, and an execution cycle), frequency bands, and frequency band widths. Note that the interference data 13 can be stored in advance in a storage device in the in-vehicle terminal 1 or can be acquired from the outside by communication. When the interference data is acquired from the outside, the interference data 13 can be acquired through the wide-area radio communication unit 17. When the radio communication unit 16 is connected to a hotspot outside the vehicle, the interference data 13 can be acquired using the hotspot. Further, information stored in advance and information acquired from the outside can be used in combination as the interference data 13. When the radio communication unit 16 uploads collected radar information (information concerning other systems detected by monitoring) to an external network, the in-vehicle terminal 1 can share interference data with other in-vehicle terminals having the same function. An operation for detecting radar information through the radio communication unit 16 is separately explained. Information concerning a channel not subjected to interference is also registered in the interference data 13 as clear channel data in the same manner. The information concerning a channel not subjected to interference can be registered as a separate database.

The map data 14 is map information used in a car navigation apparatus and the like. The map data 14 includes, for example, positions (coordinates indicating latitude and longitude) of buildings, names of the buildings, types of the buildings, heights of the buildings, and areas of the buildings. The map data 14 can be stored in advance in the storage device in the in-vehicle terminal 1 or can be acquired from the outside by communication. Further, data stored in advance and data acquired from the outside can be used in combination. The map data 14 is used in a detecting operation for other systems by the radio-communication-zone predicting unit 15. In the detecting operation for other systems performed using the map data 14, for example, if a keyword such as "airport" or "military base" is included in a name of a building around the present position, the radio-communication-zone predicting unit 15 determines that a radar is present around the in-vehicle terminal 1.

Figure 4:
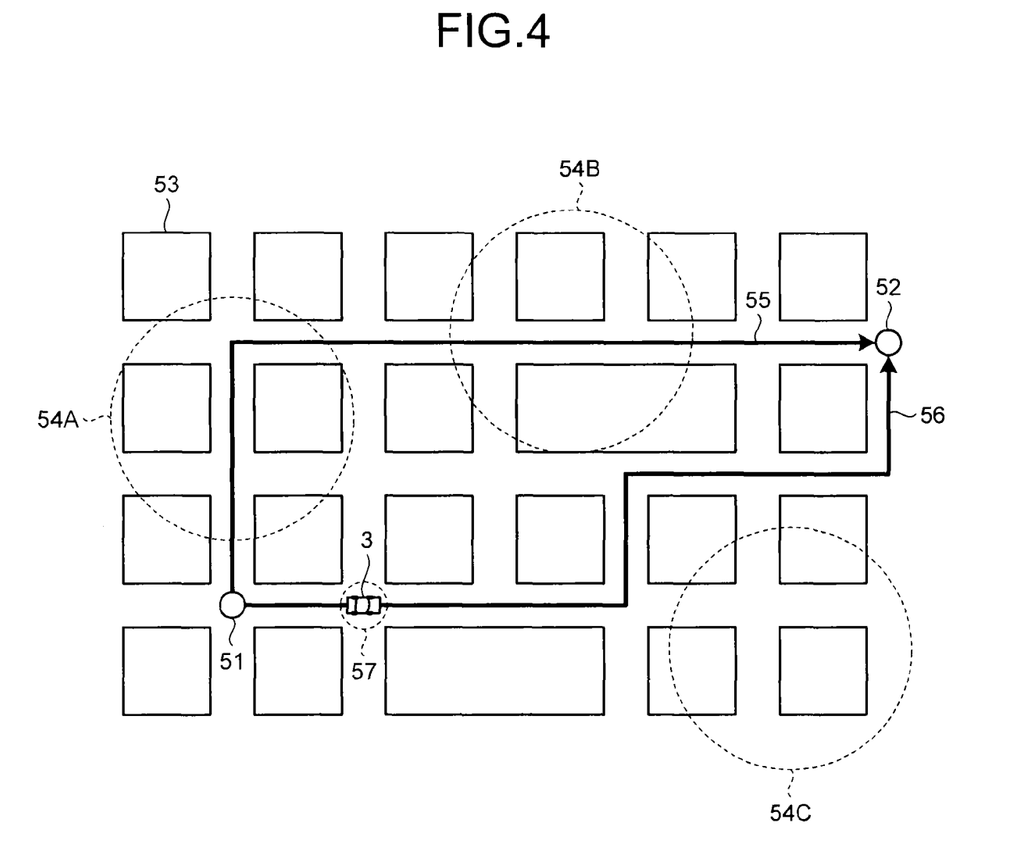
FIG. 4 is a diagram of an example of route guidance performed by the in-vehicle terminal and a car navigation system or the like in cooperation with each other.

When the in-vehicle terminal 1 and an apparatus having a route guidance function such as a car navigation system are cooperated with each other, it is possible to set a route in advance such that it is not necessary to stop the use of the 5-GHz band wireless LAN used in the vehicle in order to avoid the interference with other systems (see FIG. 4). That is, the in-vehicle terminal 1 specifies, on the basis of the interference data 13 or the like, an area where interference with a radar around the in-vehicle terminal 1 occurs. In the route guidance function, a guidance route is determined to avoid traveling in the area (area where interference occurs) specified by the in-vehicle terminal 1. Note that the in-vehicle terminal 1 specifies an area where interference with the radar occurs within a fixed range based on the present position. Route guidance performed to avoid the area specified on the basis of the interference data 13 is separately explained.

The radio-communication-zone predicting unit 15 determines, on the basis of the present position and the moving direction of itself (the in-vehicle terminal 1 or the vehicle 3), the interference data 13, and the like, whether the radio communication zone of another system overlaps the radio communication zone of itself (whether interference is likely to occur).

When the radio-communication-zone predicting unit 15 determines in the determination that the radio-communication-zone predicting unit 15 is present within the communication zone of another system (within a range in which a radar wave from another system reaches) or near the boundary of the radio communication zone of the other system, the radio-communication-zone predicting unit 15 further performs detection/search of a radar wave. The radio communication unit 16 is used to perform the detection/search of a radar wave. The detection of a radar wave is executed for a fixed period. For example, it is assumed that an execution cycle of an operation of a radar radiating a radio wave and searching for a target is multiplied by a fixed value (an integer equal to or larger than 1). The execution cycle is one of the pieces of information registered in the interference data 13. When a new radar not registered in the interference data 13 is detected in monitoring of other systems executed at the predetermined timing, the radio communication unit 16 collects information related to the radio communication zone of the detected radar (information to be registered in the interference data 13). The collected information is passed to the radio-communication-zone predicting unit 15. The radio-communication-zone predicting unit 15 registers the information collected by the radio communication unit 16 in the interference data 13. At this point, the radio-communication-zone predicting unit 15 also registers the radar position calculated on the basis of the map data 14, the present position, and the like. It is desirable to also register information concerning obstacles such as a building present around the present position. For example, during traveling through a tunnel or when a large shopping facility or the like is present between the radar and the radio-communication-zone predicting unit 15, even if the radio-communication-zone predicting unit 15 is present within the coverage of the radar wave, it is possible to continue communication in the vehicle 3 assuming that communication of the radio-communication-zone predicting unit 15 does not cause interference with the radar. To clearly indicate that communication can be continued even around the radar, it is desirable to also register information concerning obstacles such as a building. Rather than the information on the obstacles itself, information for enabling discrimination of influence on a radio communication zone due to the presence of the obstacles can be registered.

In addition to the presence or absence of overlap of the radio communication zone, the radio-communication-zone predicting unit 15 can determine, on the basis of the present time, the radar search cycle stored in the interference data 13, and the like whether it is within a service time of the radar. In that case, for example, if a radar used at a low cycle is out of the service time of the radar, after performing a search for a radar wave and confirming that the radar is not in service, it is possible to perform communication using the 5-GHz band by the radio communication unit 16.

The radio communication unit 16 is a wireless LAN communication machine that uses the 5-GHz band of IEEE302.11a/n/ac or the like. The radio communication unit 16 performs radio communication with the in-vehicle communication apparatuses 2-1 and 2-2 in the vehicle 3. When it is determined by the radio-communication-zone predicting unit 15 that the radio communication zone of another system (radar or the like) is likely to overlap the radio communication zone of the radio communication unit 16, the radio communication unit 16 performs interference detection processing for checking whether the radio communication of itself interferes with the radio communication zone of another system. When the radio communication unit 16 detects interference, the radio communication unit 16 notifies the radio-communication-zone predicting unit 15 of the information concerning the frequency channel that causes the interference and information such as a reception power value from the interference source as interference information. The radio-communication-zone predicting unit 15 that has received the notification registers the interference information acquired from the radio communication unit 16 in the interference data 13.

In this system, the acquired interference information is registered in the interference data 13 both when a setting position of a radar that can be interference is known in advance and when a new interference source not registered in the interference data 13 is determined. Therefore, it is possible to determine whether the radio communication of the radio communication unit 16 causes interference with another system.

The radio communication unit 16 periodically checks whether another system using the same frequency band is present around the in-vehicle terminal 1 during communication performed using the 5-GHz band as well. As a result of the check, when the another radio communication system (radar) is detected, according to the procedure of the conventional DFS function, the radio communication unit 16 stops the communication in the present frequency channel and moves to a frequency channel that does not cause interference or, when a frequency channel at a moving destination is not present, stops the communication. Note that, in this case, the radio communication unit 16 refers to the interference data 13 and, when clear channel data is present, selects the frequency channel indicated by the clear channel data as the moving destination. The radio communication unit 16 continues the operation for checking whether another system using the same frequency band is present around the in-vehicle terminal 1 at the frequency channel at the moving destination as well.

The interference data 13 is explained in detail. FIGS. 3A and 3B are diagrams of examples of the interference data 13. As shown in the figures, the information included in the interference data 13 is, for example, "setting position", "detection position/detection coordinates", "type", "detection/update date and time", "frequency band", "allowable signal intensity", "reception power value", "signal output", "range", "cycle/direction", and "clear channel list/priority". Note that the information included in the interference data 13 is not limited to these pieces of information. The interference data 13 can include any information as long as it is possible to discriminate whether it is likely that interference occurs in the present position of the in-vehicle terminal 1 between the in-vehicle terminal 1 and another system that uses the 5-GHz band. At least information capable of specifying a radio communication zone of a radar of another system only has to be included in the interference data 13.

The "setting position" indicates the setting position of a radar station, which is an interference source. This information is acquired in advance by a predetermined method and stored. For example, the setting position of a radar is acquired on the basis of the map data 14. The "detection position/detection coordinates" indicates the position where the vehicle 3 (the own vehicle) or another vehicle detects the radar station. The "type" indicates the type of the radar (an aviation radar, a military radar, a meteorological radar, or the like). The "detection/update date and time" indicates date and time when a radar station is detected anew and information concerning the radar station is registered or date and time when a radar station detected in the past (a radar station, information concerning which is already registered in the interference data 13) is detected again and the registered information concerning the radar station detected again is updated. The "frequency band" indicates the frequency band and the band width used by the radar station. The "allowable signal intensity" indicates the amount of signal power at which the radar station determines that mutual interference occurs. When the radar station receives a signal exceeding the allowable signal intensity, the radar station determines that mutual interference occurs. The "reception power value" indicates the amount of received power of a radar wave. The "signal output" indicates the transmission output of the radar wave. The "range" indicates the range of the radar wave. It is possible to grasp a radio communication zone that is a coverage of the radar wave by using the range and the setting position information described above. The "cycle/direction" indicates the service cycle of the radar (cycle at which the radar wave is transmitted) and directivity during a service (direction in which the radar wave is transmitted). The "clear channel list/priority" indicates the radio frequency bands not interfering with the radar wave from the radar station (a list of clear channels, which are non-interfering channels) and priority of use of the clear channels. The priority of use is determined to be, for example, higher for a clear channel with low noise power received by the channel (frequency). Note that the interference data 13 can include other information.

FIG. 3A shows an example of the interference data 13 in which only information created in advance on the basis of an establishment situation and the like of a radio station is registered. On the other hand, FIG. 3B shows an example of the interference data 13 in which information created in advance on the basis of an establishment situation and the like of a radio station and information collected by the in-vehicle terminal 1 are registered.

The interference data 13 shown in FIG. 3B is obtained by, every time the in-vehicle terminal 1 detects a radar station, collecting and additionally registering information concerning the detected radar station. In the in-vehicle terminal 1, the radio communication unit 16 searches for a radar station when the radio communication unit 16 receives, from the radio-communication-zone predicting unit 15, a detecting operation execution command for a radar station using the 5-GHz band or autonomously searches for a radar station at a predetermined timing. When the radio communication unit 16 detects a radar station, the radio communication unit 16 further collects information concerning the detected radar station (information to be registered in the interference data 13). When the information collection ends, the radio communication unit 16 passes the collected information to the radio-communication-zone predicting unit 15. The radio-communication-zone predicting unit 15 registers the received information in the interference data 13. At this point, the radio-communication-zone predicting unit 15 checks, on the basis of the "detection position/detection coordinates", the "reception power value", and the like, whether the received information is the latest information concerning the radar station detected in the past in the same position. When the received information is the latest information, the radio-communication-zone predicting unit 15 overwrites the information registered when the radar station was detected in the past with the received information and registers the received information. Note that, in the search by the radio communication unit 16, when collecting the information concerning the detected radar station, the radio communication unit 16 can search for a channel not causing mutual interference as well. When the radio communication unit 16 detects a channel not causing mutual interference, the radio communication unit 16 can register the detected channel in the clear channel list. When a plurality of radar stations are detected in the search by the radio communication unit 16, the radar stations can be registered as one record or can be registered as individual records. When the radar stations are registered as individual records, for example, in the clear channel information, a channel not used in all the detected radar stations is registered. When the detected radar station is a radar station not registered in the database beforehand, the radar station is registered in the interference data 13 as an unregistered radar station. As explained above, the interference data 13 can be stored in the wide-area radio communication unit 17 of the in-vehicle terminal 1 or stored in the database server 19 on the Internet 18 via the radio communication unit 16 to enable other vehicles (in-vehicle terminals of other vehicles) to use the interference data 13.

Note that, in FIG. 3B, "detection information on an unregistered radar station" is information concerning a radar station detected anew.

Route guidance performed to avoid an area specified on the basis of the interference data 13 is explained with reference to FIG. 4. FIG. 4 is a diagram of an example of route guidance performed by the in-vehicle terminal 1 and the car navigation system or the like in cooperation with each other.

In FIG. 4, a place of departure 51, a place of arrival 52, the vehicle 3 including the in-vehicle terminal 1 shown in FIG. 1, a radio communication zone 57 indicating a radio wave interference range, which is the coverage of the radio wave transmitted by the radio communication unit 16 of the in-vehicle terminal 1 included in the vehicle 3, a plurality of buildings 53 indicated by rectangles, radio communication zones 54A, 54B, and 54C of other systems such as radars, a conventional route guidance result 55, and a route guidance result 56 for minimizing a distance, time, fuel consumption, and the like while avoiding mutual interference between the radio communication zones 54A, 54B, and 54C of other systems and the radio communication zone 57 are shown. Note that the conventional route guidance result 55 is the result of a route guidance performed not in cooperation with the in-vehicle terminal 1, that is, the result of a route guidance performed without taking into account interference between the radio wave transmitted by the radio communication unit 16 of the in-vehicle terminal 1 and radio waves transmitted by other systems. In the conventional route guidance result 55, which is, for example, the shortest time route with a small number of crossings, the radar stations pass the radio communication zones 54A and 54B. When the radio communication zone 57 of the in-vehicle terminal 1 included in the vehicle 3 and the radio communication zone (the radio communication zone 54A or 54B) of another system overlap, the in-vehicle terminal 1 needs to stop communication. In contrast, in the route guidance to which the present embodiment is applied, the in-vehicle terminal 1 performs radio communication zone prediction (prediction of radio communication zones of other systems based on the interference data 13), detects the radio communication zones 54A, 54B, and 54C of the radar stations, and derives the route guidance result 56 taking into account the result of the detection. Therefore, the vehicle 3 travels according to the route guidance result 56. Consequently, it is possible to continuously use the wireless LAN operating in the 5-GHz band of the vehicle 3. Note that when the traveling distance and the traveling time are extremely long in the route guidance to which the present embodiment is applied, guidance can be performed such that the frequency of occurrence of interference with other systems is reduced as much as possible and the traveling distance and the traveling time do not become extremely long. It is possible to allow the user to select the conventional route guidance performed without taking into account interference or the route guidance in the present embodiment performed taking into account interference.

Figure 5:
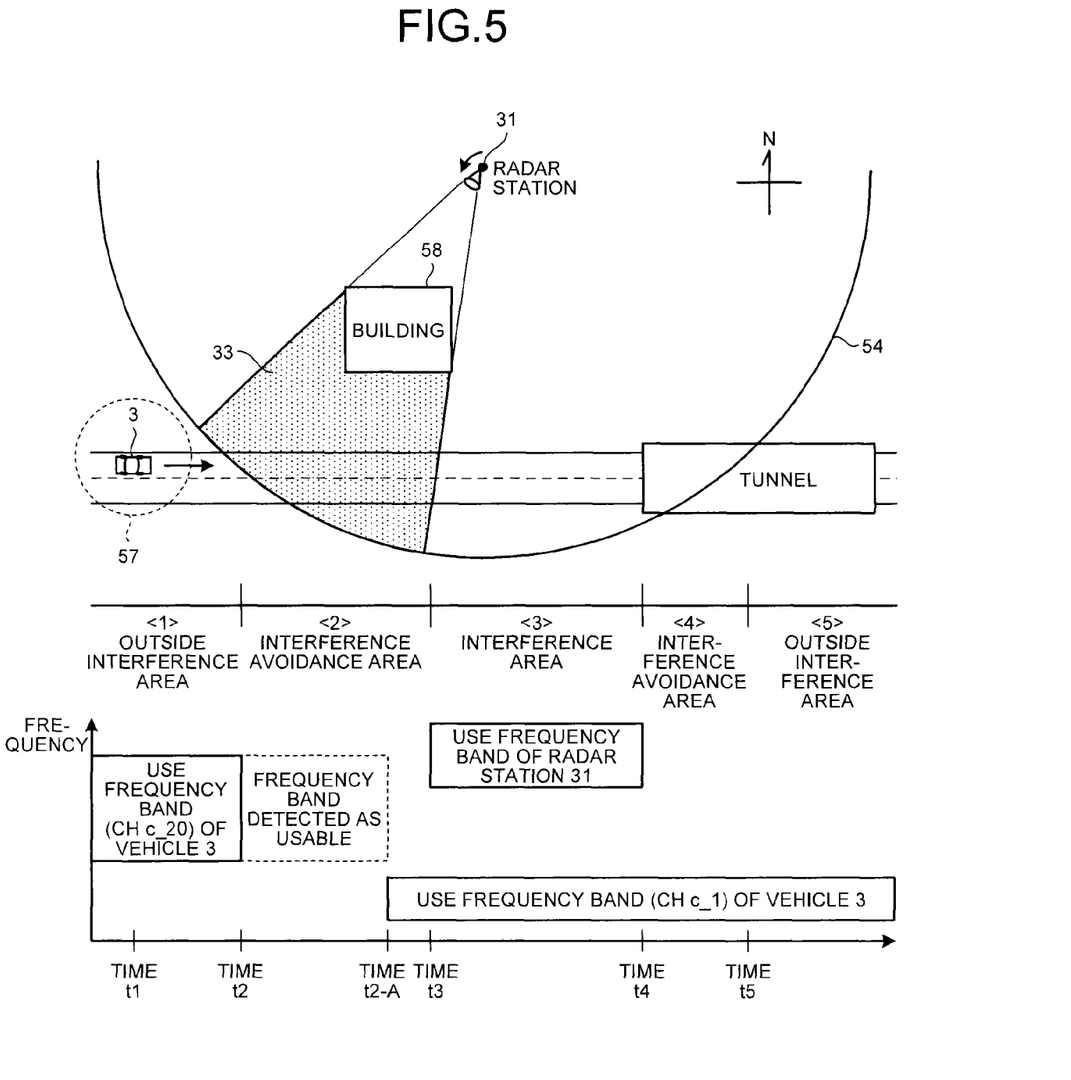
FIG. 5 is a diagram of a service example of the in-vehicle terminal.

A specific example of the operation of the in-vehicle terminal 1 is explained with reference to FIG. 5. FIG. 5 is a diagram of a service example of the in-vehicle terminal 1. In FIG. 5, the vehicle 3 on which the in-vehicle terminal 1 is mounted, a radar station 31, a radio communication zone 54 indicating the coverage of the radio wave transmitted from the radar station 31, the radio communication zone 57 indicating the coverage of the radio wave transmitted from the in-vehicle terminal 1, a building 58 that blocks the radio wave transmitted from the radar station 31, and a non-radio communication zone 33 indicating the range in which the radio transmitted from the radar station 31 is blocked by the building 58 and interference does not occur are shown. The use frequency band corresponding to the traveling position in traveling of the vehicle 3 from the west to the east is also shown. The radar station 31 is a radar station that is in service while periodically rotating the search direction for a target (a transmission direction of a radar wave). Note that it is assumed that radar stations other than the radar station 31 shown in the figure are not present around the vehicle 3.

In the example shown in FIG. 5, when the in-vehicle terminal 1 detects that the vehicle 3 on which the in-vehicle terminal 1 is mounted moves in the east direction and approaches the position where interference with the radar station 31 occurs, the in-vehicle terminal 1 changes a frequency band to be used from a "frequency band (CH c_20)" to a "frequency band (CH c_1)" and continues communication.

At time t1, the in-vehicle terminal 1 is located <1> outside an interference area, that is, in an area sufficiently away from the radar station 31 where interference does not occur (the radio communication zones 54 and 57 do not overlap). At this point, the radio communication unit 16 of the in-vehicle terminal 1 is communicating with the in-vehicle communication apparatuses 2-1 and 2-2 shown in FIG. 2 using the frequency band (CH c_20).

Thereafter, the vehicle 3 travels to the east and approaches the boundary of the radio communication zone 54, where the radio wave from the radar station 31 reaches, at a point of time t2. Originally, mutual interference occurs because the radio communication zone 54 of the radar station 31 and the radio communication zone 57 of the vehicle 3 overlap. However, the radio-communication-zone predicting unit 15 of the in-vehicle terminal 1 specifies the positional relation between the radar station 31 and the building 58 and the radio communication zone 54 of the radar station 31 on the basis of the interference data 13 and the map data 14. Further, the radio-communication-zone predicting unit 15 grasps, on the basis of the present position notified from the present-position detecting unit 11, that the radio-communication-zone predicting unit 15 (the in-vehicle terminal 1) is located in the non-radio communication zone 33 (located in <2> an interference avoidance area). Therefore, the radio-communication-zone predicting unit 15 determines that no problem occurs even if the frequency band (CH c_20) is continuously used. As a result, the radio communication unit 16 continues the communication without switching the use frequency band.

The vehicle 3 further moves. At a point of time 2-A, the radio-communication-zone predicting unit 15 of the in-vehicle terminal 1 detects, on the basis of the present position notified from the present-position detecting unit 11 and the interference data 13 and the map data 14, that if the vehicle 3 continues to move, the non-radio communication zone 33 ends and the vehicle 3 enters the radio communication zone 54 (<3> an interference area). As a result, the radio-communication-zone predicting unit 15 instructs the radio communication unit 16 to change the use frequency band. When information concerning clear channels, which are channels in which interference with the radar station 31 does not occur around the present position, is registered in the interference data 13, the radio-communication-zone predicting unit 15 instructs the radio communication unit 16 to select one of the clear channels according to the priority and switch the use frequency band to the selected channel. Note that, for example, by using a channel switching method described in IEEE802.11h, IEEE802.11y, or the like as a switching method, it is possible to switch an operating channel while preventing the communication from being suspended. In the example shown in FIG. 5, the radio-communication-zone predicting unit 15 instructs the radio communication unit 16 to switch the use frequency band to the frequency band (CH c_1), which is one of the clear channels. The radio communication unit 16 switches the use frequency band and continues the communication according to the instruction. In contrast, when the clear channel information is not registered in the interference data 13, after entering <3> the interference area, the radio communication unit 16 searches for a channel in which interference does not occur. When the channel is found, the radio communication unit 16 continues the communication using the channel. The radio communication unit 16 notifies the radio-communication-zone predicting unit 15 of the found channel as a clear channel. The radio-communication-zone predicting unit 15 notified of the clear channel registers the clear channel information in the interference data 13 together with, for example, information concerning the present position.

Note that, when information concerning a service time of the radar station 31 is registered in the interference data 13 and it is evident that time t2-A is out of the service time, the radio-communication-zone predicting unit 15 determines that no problem occurs even if the frequency band (CH c_20) is continuously used.

When the vehicle 3 further moves, at time t4, the vehicle 3 enters a tunnel. Consequently, although the vehicle 3 is traveling in the radio communication zone 54 of the radar station 31, mutual interference does not occur. Therefore, the frequency band (CH c_20) used by the radar station 31 can also be used. Note that, when the non-interference with the radar station 31 due to the tunnel is not included in the clear channel information in the interference data, the frequency band (CH c_20) is additionally registered in the interference data 13 as information concerning a clear channel at this position. When the interference data 13 is managed by the database server 19 on the Internet 18 and shared with other communication apparatuses, the radio-communication-zone predicting unit 15 registers the clear channel information in the database server 19 via the wide-area radio communication unit 17 or the radio communication unit 16.

Figure 6:
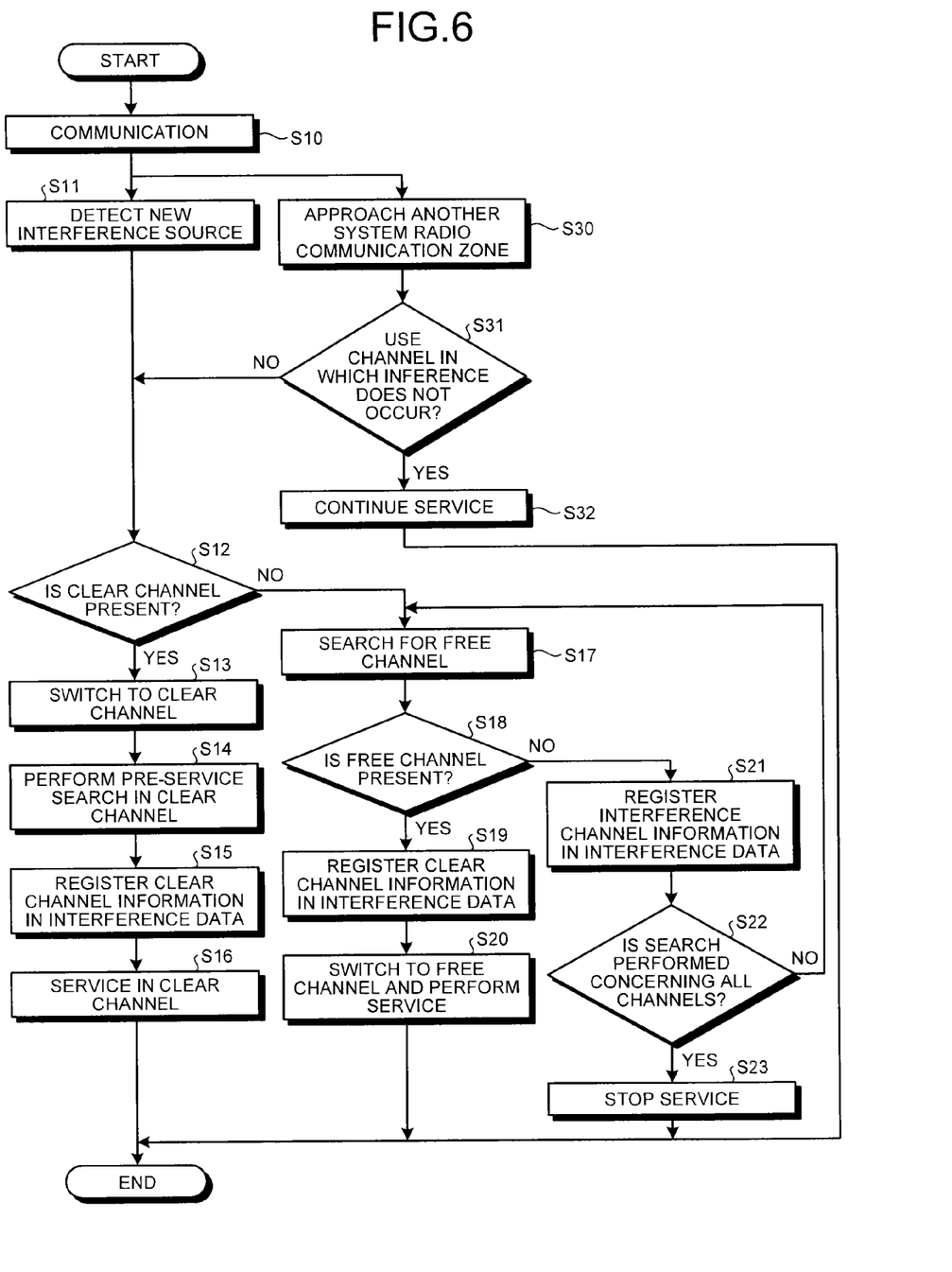
FIG. 6 is a flowchart explaining an example of a channel switching operation procedure in the in-vehicle terminal.

Details of a channel switching operation in the in-vehicle terminal 1 are explained with reference to FIG. 1, FIG. 2, and FIG. 6. FIG. 6 is a flowchart explaining an example of a channel switching operation procedure in the in-vehicle terminal 1.

As an initial state, the radio communication unit 16 of the in-vehicle terminal 1 is performing communication with the in-vehicle communication apparatuses 2-1 and 2-2 using the 5-GHz band (step S10). In this state, when the radio communication unit 16 detects another system (radar station or the like) that uses the frequency same as the frequency of the radio communication unit 16, the radio communication unit 16 collects information concerning the detected system and notifies the radio-communication-zone predicting unit 15 of the information. The radio-communication-zone predicting unit 15 that has received the notification checks the received information. When the radio-communication-zone predicting unit 15 determines that another system (a new interference source) unregistered in the interference data 13 is detected (step S11), the radio-communication-zone predicting unit 15 checks the interference data and checks whether a clear channel that does not cause interference with the other system is present in the present position (step S12).

When the clear channel is present (Yes at step S12), the radio-communication-zone predicting unit 15 instructs the radio communication unit 16 to perform switching to the clear channel. The radio communication unit 16 starts an operation for switching a channel used in communication with the in-vehicle communication apparatuses 2-1 and 2-2 to the instructed clear channel (step S13). In the switching operation, first, in order to check whether no problem occurs even if a service in the clear channel is started, the radio communication unit 16 performs a pre-service search (step S14). At this point, the radio communication unit 16 checks whether usable channels (channels in which interference with the other system detected at step S14 does not occur) are present other than the instructed clear channel. As a result of the check, when the usable channels are present, the radio communication unit 16 notifies the radio-communication-zone predicting unit 15 of the usable channels. The radio-communication-zone predicting unit 15 that has received the notification registers the channels that the radio-communication-zone predicting unit 15 is notified of in the interference data 13 as clear channels detected anew in association with present position information and the like (step S 15). When the pre-service search at step S14 ends, the radio communication unit 16 switches the service to the service in the clear channel and continues the communication (step S16). Note that, when the radio communication unit 16 detects in the pre-service search that the clear channel notified from the radio-communication-zone predicting unit 15 is actually a channel that causes interference, if another channel that does not cause interference is present, the radio communication unit 16 switches the service to a service in the channel. If another channel that does not cause interference is not present, the radio communication unit 16 ends the communication.

Note that, in the present embodiment, the radio communication unit 16 can perform the wireless LAN communication in at least the 5-GHz band. However, when the radio communication unit 16 and the in-vehicle communication apparatuses 2-1 and 2-2 can perform wireless LAN communication in a 2.4-GHz band and a 60-GHz band other than the 5-GHz band, in the pre-service search at step S14, in addition to the search targeting the 5-GHz band, searches targeting the 2.4-GHz band and the 60-GHz band can be executed as well. The searches targeting the 2.4-GHz band and the 60-GHz band can be performed only when a usable channel (a channel in which interference does not occur between the in-vehicle terminal 1 and the detected other system) cannot be found in the search in the 5-GHz band. Steps S14 and S15 can be omitted when it is evident that interference with another system does not occur when the instructed clear channel is used. For example, when another system detected in the past is detected again and when the elapsed time from the last detection is short (e.g., within a few days), step S14 and step S15 following step S14 are omitted. When these steps are omitted, the communication suspension time during the channel switching can be reduced.

In contrast, when the clear channel is not present (No at step S12), the radio-communication-zone predicting unit 15 provides an instruction for switching to another channel without notifying the radio communication unit 16 of the clear channel. The radio communication unit 16 that has received the instruction performs a free channel search and checks whether a free channel in which interference does not occur between the in-vehicle terminal 1 and the other system detected at step S11 is present (step S17). Note that, in the free channel search, usable frequency bands (the 2.4-GHz band and the 60-GHz band) other than the 5-GHz band can be added to targets for the search. When the free channel is found (Yes at step S18), the radio communication unit 16 notifies the radio-communication-zone predicting unit 15 of the found free channel (or a plurality of free channels). The radio-communication-zone predicting unit 15 that has received the notification registers the free channel that the radio-communication-zone predicting unit 15 is notified of in the interference data 13 as a clear channel in the present position in association with, for example, information concerning the present position (step S19). The radio communication unit 16 selects one of the free channels found at step 17, switches the service to the service in the selected channel, and continues the communication (step S20).

As a result of the free channel search at step S17, when the free channel is not found (No at step S18), the radio communication unit 16 notifies the radio-communication-zone predicting unit 15 of information obtained by the search as interference channel information. The radio-communication-zone predicting unit 15 registers the interference channel information that the radio-communication-zone predicting unit 15 is notified of in the interference data 13 (step S21). The radio communication unit 16 performs searches concerning all the channels including usable frequency bands other than the 5-GHz band. As a result of the searches, if no free channel is found, the radio communication unit 16 stops the service and ends the communication (Yes at step S22, step S23). After ending the communication, the radio communication unit 16 can execute the search for the free channel again at a predetermined timing and resume the communication when the free channel can be found.

The detection of a new interference source at step S11 is processing performed by the radio communication unit 16. In parallel to the processing, the radio-communication-zone predicting unit 15 monitors, on the basis of the present position information acquired from the present-position detecting unit 11, the moving speed information acquired from the vehicle-speed detecting unit 12, and the interference data 13 and the map data 14, whether the vehicle 3 has approached the already-detected interference source (the radio communication zone of another system). When detecting the approach to the radio communication zone of the other system (step S30), the radio-communication-zone predicting unit 15 checks whether continuous use of a channel currently used by the radio communication unit 16 is possible, that is, whether a channel in which interference does not occur between the in-vehicle terminal 1 and the approaching other system is in use (step S31). When the continuous use is possible (Yes at step S31), the radio-communication-zone predicting unit 15 continues the service (the communication) without performing the channel switching and the like (step S32). In contrast, when the continuous use is impossible (No at step S31), the radio-communication-zone predicting unit 15 executes step S12 and the processing following step S12.

As explained above, the radio communication apparatus (the in-vehicle terminal 1) in the present embodiment determines, on the basis of the interference data and the map data, which are information concerning other systems in which interference occurs, acquired by the predetermined method and stored and the present position and the moving speed of the radio communication apparatus, whether it is likely that communication interface occurs between the radio communication apparatus and other systems. When it is likely that interference occurs, switching to a channel in which interference does not occur is performed. When channels in which interference does not occur are found in the channel search carried out during the channel switching or the like, the radio communication apparatus stores the channels as usable channels (clear channels) that are unlikely to cause interference in a place where the channels are found (a position where the channel search is executed). In future, the radio communication apparatus refers to the channels in channel switching necessity determination performed when the radio communication apparatus passes the same place and in switching destination candidate selection performed when channel switching is necessary. Consequently, it is possible to realize avoidance of interference and a reduction in interference with other systems such as radars. In addition, it is possible to efficiently determine a channel at a switching destination when the channel switching for interference avoidance is executed. Therefore, it is possible to reduce the communication suspension time during the channel switching.

In the case of a configuration in which interference information collected by executing the channel search (various pieces of information concerning other systems found in the channel search) is registered in a database on an external network and shared with other radio communication apparatuses, it is possible to efficiently collect information necessary for determining whether communication interference is likely to occur between the radio communication apparatus and other systems. Further, even when the radio communication apparatus travels in a route on which the radio communication apparatus has not traveled before, that is, a route on which the radio communication apparatus has not collected interference information, it is possible to determine, using interference information collected by other radio communication apparatuses that have traveled the route, whether it is likely that communication interface occurs between the radio communication apparatus and other systems. When it is likely that interference occurs in a channel in use, it is possible to learn a channel in which interference does not occur.

INDUSTRIAL APPLICABILITY

As explained above, the radio communication apparatus according to the present invention is useful as a radio communication apparatus used while moving in a state of, for example, being mounted on a mobile body and is suitable for, in particular, a radio communication system capable of reducing interference on other systems that use the same frequency band.

REFERENCE SIGNS LIST 1 in-vehicle terminal (radio communication apparatus)
2-1, 2-2 in-vehicle communication apparatus
3 vehicle
4, 5 radio wave
11 present-position detecting unit
12 vehicle-speed detecting unit
13 interference data
14 map data
15 radio-communication-zone predicting unit
16 radio communication unit
17 wide-area radio communication unit
18 Internet (external network)
19 database server
31 radar station
33 non-radio communication zone
51 place of departure
52 place of arrival
53, 58 building
54, 54A, 54B, 54C, 57 radio communication zone
55, 56 route guidance result

The invention claimed is:

1. A radio communication apparatus comprising:
a radio communication unit capable of performing radio communication by using a 5-GHz band;
an interference predicting unit that predicts interference with another system that uses a 5-GHz band on a basis of an own position and interference position data in which information concerning a position where interference with the another system occurs is stored;
a channel changing unit that changes a used channel when the interference is predicted to occur or when interference with the another system is detected by the radio communication unit; and
an interference-position-data updating unit that updates, when interference with the another system is detected by the radio communication unit, the interference position data on a basis of a result of the detection.

2. The radio communication apparatus according to claim 1, further comprising a speed detecting unit that detects an own moving speed, wherein
the channel changing unit predicts, on a basis of the own moving speed, the own position, map data, and the interference position data, whether interference occurs in the channel being used by the radio communication unit and, when interference occurrence is predicted, instructs the radio communication unit to switch a used channel.

3. The radio communication apparatus according to claim 1, wherein
the radio communication unit monitors, at a predetermined timing, a radio wave from another system that uses a 5-GHz band and, when the radio wave from the another system is detected, further collects information concerning the another system, the radio wave from which is detected, and
the channel changing unit updates the interference position data on a basis of collected information and the own position.

4. The radio communication apparatus according to claim 3, wherein
when the radio communication unit detects a radio wave from another system, the radio communication unit collects information concerning the another system, the radio wave from which is detected, and searches for a clear channel, which is a channel in which mutual interference does not occur between the radio communication apparatus and the another system, and
the channel changing unit updates the interference position data on a basis of collected information and the own position and, when the clear channel is found, further registers information concerning the clear channel in the interference position data.

5. The radio communication apparatus according to claim 4, wherein, when switching of the channel being used by the radio communication unit is necessary, the channel changing unit checks whether a clear channel corresponding to the own position is present, when the clear channel is present, instructs the radio communication unit to change the channel to the clear channel, and, when the clear channel is not present, instructs the radio communication unit to search for a channel in which mutual interference does not occur between the radio communication apparatus and the another system, the radio wave from which is detected, and switch the channel.

6. The radio communication apparatus according to claim 1, wherein the radio communication apparatus registers the interference position data in a data server on an external network and shares the interference position data with another radio communication apparatus.

7. The radio communication apparatus according to claim 1, wherein
   the radio communication apparatus is mounted on an automobile including a route guidance apparatus, and
   the channel changing unit detects, on a basis of a moving speed of the automobile, the own position, map data, and the interference position data, another system that is present within a fixed range including the own position and uses a 5-GHz band, and instructs the route guidance apparatus to determine a guidance route taking into account a result of detection.

* * * * *